US011648805B2

(12) United States Patent
Kuwano (10) Patent No.: US 11,648,805 B2
(45) Date of Patent: May 16, 2023

(54) PNEUMATIC TIRE

(71) Applicant: TOYO TIRE CORPORATION, Itami (JP)

(72) Inventor: Shingo Kuwano, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/555,625

(22) Filed: Dec. 20, 2021

(65) Prior Publication Data

US 2022/0111685 A1    Apr. 14, 2022

Related U.S. Application Data

(63) Continuation of application No. 16/209,343, filed on Dec. 4, 2018, now Pat. No. 11,260,701.

(30) Foreign Application Priority Data

Dec. 25, 2017    (JP) .............................. JP2017-247778

(51) Int. Cl.
*B60C 13/02*    (2006.01)
*B60C 11/13*    (2006.01)
(Continued)

(52) U.S. Cl.
CPC .......... *B60C 11/1369* (2013.01); *B60C 11/01* (2013.01); *B60C 11/0327* (2013.01);
(Continued)

(58) Field of Classification Search
CPC ..... B60C 11/1369; B60C 11/11; B60C 11/01; B60C 13/02; B60C 13/002; B60C 13/00
See application file for complete search history.

(56) References Cited

U.S. PATENT DOCUMENTS

2008/0105348 A1    5/2008    Byrne et al.
2010/0288409 A1    11/2010    Ohara
(Continued)

FOREIGN PATENT DOCUMENTS

CN    101557947 A    10/2009
CN    101890883 A    11/2010
(Continued)

OTHER PUBLICATIONS

Office Action dated Jul. 28, 2020, issued in counterpart CN Application No. 201811430371.8, with English Translation. (15 pages).
(Continued)

*Primary Examiner* — Cedrick S Williams
(74) *Attorney, Agent, or Firm* — WHDA, LLP (57) ABSTRACT

A pneumatic tire has paired bead portions, paired sidewall portions, a tread portion, a plurality of lug grooves extending from a shoulder area of the tread portion to reach a buttress area of the sidewall portion, and a block defined by the plurality of lug grooves. The block includes a shoulder block provided in the shoulder area, and a buttress block provided in the buttress area. The buttress area is provided with an annular rib annularly extending along a tire circumferential direction. The lug grooves are comparted into an outside lug groove positioned in an outer side of the annular rib, and an inside lug groove positioned in an inner side of the annular rib. A widened portion is provided in at least part of the plurality of lug grooves so as to enlarge a width of the annular rib.

8 Claims, 9 Drawing Sheets

(51) Int. Cl.
*B60C 11/01* (2006.01)
*B60C 11/03* (2006.01)
*B60C 11/11* (2006.01)
*B60C 11/12* (2006.01)

(52) U.S. Cl.
CPC ......... *B60C 11/11* (2013.01); *B60C 11/1204* (2013.01); *B60C 11/1236* (2013.01); *B60C 13/02* (2013.01); *B60C 2011/013* (2013.01); *B60C 2011/0358* (2013.01); *B60C 2011/1213* (2013.01); *B60C 2011/1254* (2013.01); *B60C 2200/14* (2013.01)

(56) References Cited

U.S. PATENT DOCUMENTS

| | | | |
|---|---|---|---|
| 2017/0166013 A1 | 6/2017 | Kuwano | |
| 2019/0016179 A1* | 1/2019 | Yamakawa | ......... B60C 11/1204 |
| 2019/0193478 A1 | 6/2019 | Kuwano | |
| 2019/0299719 A1 | 10/2019 | Murata | |

FOREIGN PATENT DOCUMENTS

| | | |
|---|---|---|
| JP | 11-291718 A | 10/1999 |
| JP | 2004-291937 A | 10/2004 |
| JP | 2015-168301 A | 9/2015 |
| JP | 2017-109543 A | 6/2017 |
| JP | 2017-124733 A | 7/2017 |
| JP | 6194984 B1 | 9/2017 |
| JP | 2017-213925 A | 12/2017 |
| JP | 2019-111967 A | 7/2019 |

OTHER PUBLICATIONS

Office Action dated Feb. 18, 2021, issued in counterpart CN Application No. 201811430371.8, with English translation (11 pages).
Office Action dated Aug. 10, 2021, issued in counterpart JP Application No. 2017-247778, with English Translation. (6 pages).
Office Action dated Oct. 28, 2022, issued in counterpart JP application No. 2021-197691, with English translation. (6 pages).

* cited by examiner

PNEUMATIC TIRE

CROSS-REFERENCE TO RELATED APPLICATIONS

This application is a continuation of U.S. application Ser. No. 16/209,343, filed on Dec. 4, 2018, which is based upon and claims the benefit of priority from the prior Japanese Patent Application No. 2017-247778, filed on Dec. 25, 2017, the entire contents of which are incorporated herein by reference.

BACKGROUND OF THE INVENTION

Field of the Invention

The present invention relates to a pneumatic tire aiming at traveling on a punishing road such as a muddy ground and a rocky stretch.

Description of the Related Art

There are known pneumatic tires each of which has a plurality of buttress blocks arranged in buttress area of sidewall portion for the purpose of enhancing driving performance on a punishing road such as a muddy ground and a rocky stretch. With the tire having such buttress blocks, traction is generated by shearing resistance in traveling on the punishing road (traction effect), which enhances punishing road run-through performance. Further, it is possible to obtain an effect of distancing an external injury factor such as an angular portion on a rock face from an outer surface of a sidewall portion (a protection effect), and an external injury resistance is improved. Further, since it is possible to obtain an effect of decorating with a concavo-convex shape of a buttress block (a decoration effect), it is possible to improve a design property on a tire side surface.

In each of Patent Documents 1 and 2, a pneumatic tire having an annular rib extending in annular shape across buttress blocks is described. In Patent Document 3, an annular rib is provided at upper end position of buttress block. In Patent Document 1, it is set out that a complicated concavo-convex shape can be formed by a step corresponding to an annular rib and easily bite the mud, which is advantageous for enhancing a traction effect. In relation to the tire having the annular rib mentioned above, the inventor of the present invention has found that a rigidity of the annular rib is low in a lug groove which comparts a buttress block, and there is room for enhancing the protection effect by improving the low rigidity. Further, the inventor has found that the tire may look like the buttress block is segmentalized at the annular rib as a boundary, and there is room for improvement of the decoration effect.

PRIOR ART DOCUMENT

Patent Document

Patent Document 1: JP-A-2017-124733
Patent Document 2: JP-A-2015-168301
Patent Document 3: JP-B-6194984

SUMMARY OF THE INVENTION

The present invention is made by taking the actual condition mentioned above into consideration, and an object of the present invention is to provide a pneumatic tire which improves a protection effect and a decoration effect of a buttress area in which an annular rib cutting across the buttress block is provided.

The object can be achieved by the following present invention. The present invention provides a pneumatic tire comprising a pair of bead portions, a pair of sidewall portions extending outward in a tire diametrical direction from each of the pair of bead portions, a tread portion connected to an outer end of each of the pair of sidewall portions in a tire diametrical direction, a plurality of lug grooves extending outward in a tire width direction from a shoulder area of the tread portion to reach a buttress area of the sidewall portion, and a block defined by the plurality of lug grooves, wherein the block includes a shoulder block provided in the shoulder area, and a buttress block provided in the buttress area, wherein the buttress area is provided with an annular rib which annularly extends along a tire circumferential direction while cutting across the buttress block, wherein, in the buttress area, the plurality of lug grooves are comparted into an outside lug groove positioned in an outer side of the annular rib in the tire diametrical direction, and an inside lug groove positioned in an inner side of the annular rib in the tire diametrical direction, and wherein a widened portion is provided in at least part of the plurality of lug grooves so as to enlarge a width of the annular rib. In the lug groove in which the widened portion is provided, the rigidity of the annular rib is enhanced, and the annular rib serving as the boundary segmentalizing the buttress block is hard to be conspicuous. As a result, the protection effect and the decoration effect of the buttress area are improved.

It is preferable that one lug groove or two lug grooves in which the widened portion is provided, and one lug groove or two lug grooves in which the widened portion is not provided are alternately arranged in the tire circumferential direction. As a result, the lug groove having the widened portion and the lug groove having no widened portion are appropriately mixed, and the annular rib serving as the boundary segmentalizing the buttress block is hard to be conspicuous, so that the decoration effect is well improved.

It is preferable that the widened portion is provided in both of an outer side of the annular rib in the tire diametrical direction and an inner side of the annular rib in the tire diametrical direction, in order to enhance the protection effect. Further, according to the structure mentioned above, since a design sense of unity can be easily applied to an outer side in a tire diametrical direction and an inner side in the tire diametrical direction of the annular rib, the decoration effect of the buttress area is improved.

It is preferable that an extending direction in which the outside lug groove extends to an inner side in the tire diametrical direction and an extending direction in which the inside lug groove extends to an outer side in the tire diametrical direction are out of alignment, in the lug groove in which the widened portion is provided. According to the structure mentioned above, since a design continuity between the outside lug groove and the inside lug groove disappears in the lug groove in which the widened portion is provided, it is possible to make the annular rib appear as though the annular rib does not extend in the tire circumferential direction. As a result, the annular rib serving as the boundary segmentalizing the buttress block is hard to be conspicuous, so that the decoration effect is well improved.

It is preferable that the extending direction in which the outside lug groove extends to the inner side in the tire diametrical direction is inclined to one side in the tire circumferential direction toward the inner side in the tire diametrical direction, and the extending direction in which the inside lug groove extends to the outer side in the tire diametrical direction is inclined to the other side in the tire circumferential direction toward the outer side in the tire diametrical direction, in the lug groove in which the widened portion is provided. As a result, in the lug groove in which the widened portion is provided, it is possible to make the annular rib appear as though the annular rib does not extend in the tire circumferential direction, and the annular rib serving as the boundary segmentalizing the buttress block is hard to be conspicuous, so that the decoration effect is well improved.

It is preferable that a termination of at least one of the outside lug groove and the inside lug groove is inclined to the tire circumferential direction, in the lug groove in which the widened portion is provided. As a result, in the lug groove in which the widened portion is provided, it is possible to make the annular rib appear as though the annular rib does not extend in the tire circumferential direction, and the annular rib serving as the boundary segmentalizing the buttress block is hard to be conspicuous, so that the decoration effect is well improved.

It is preferable that a sipe is formed on a surface of the buttress block defined by the lug groove in which the widened portion is provided. The edge component of the buttress block is somewhat reduced by the provision of the widened portion. However, since the edge component can be increased by forming the sipe in the buttress block, the sipe is of help to maintain and improve the traction effect. In the light of increase of the edge component on the basis of the sipe, the front end of the sipe is preferably closer to the annular rib than the outside lug groove and the inside lug groove.

DETAILED DESCRIPTION OF THE PREFERRED EMBODIMENTS

Figure 1:
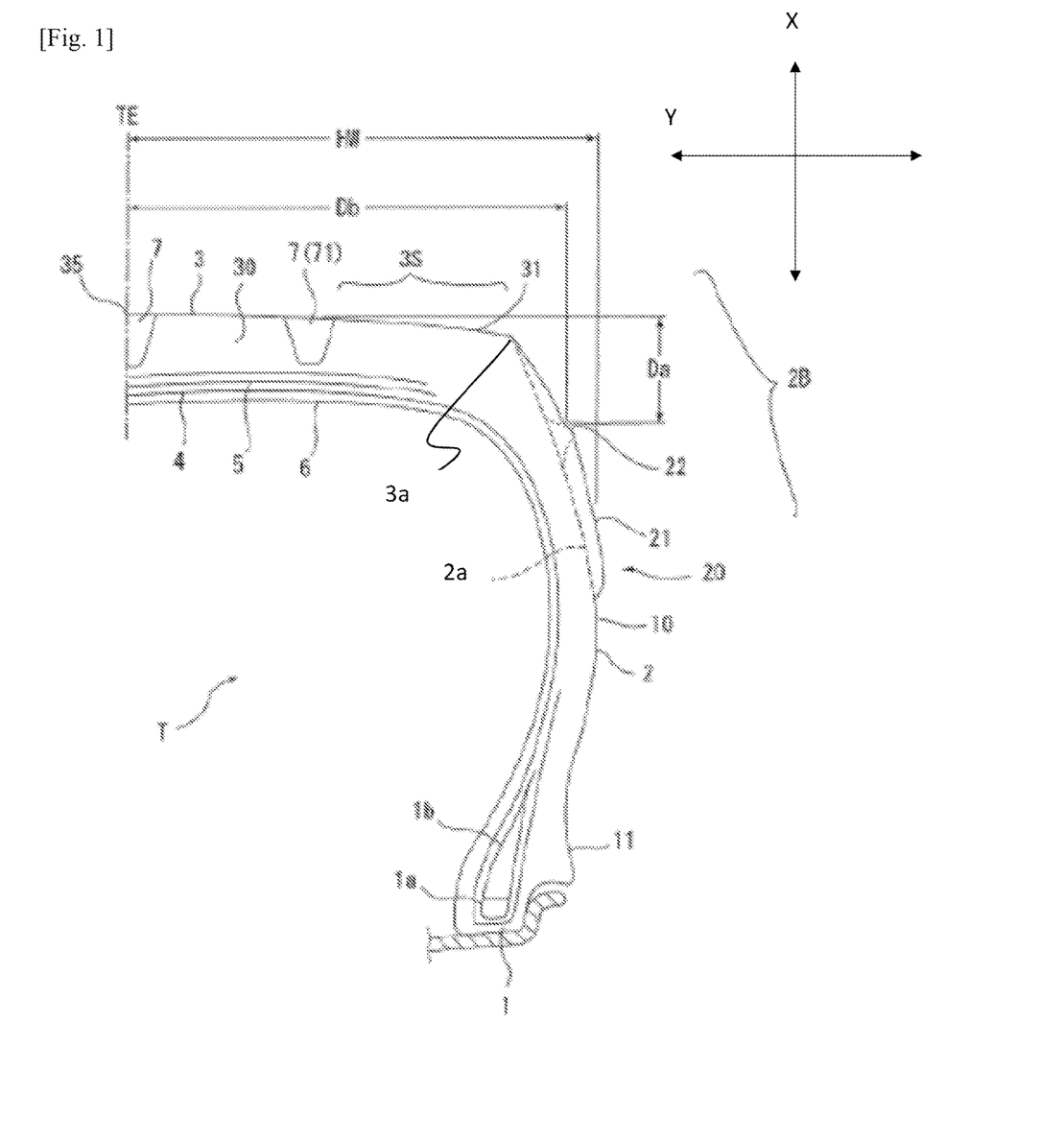
FIG. 1 is a tire meridian half cross sectional view schematically showing an example of a pneumatic tire according to the present invention.
Figure 2:
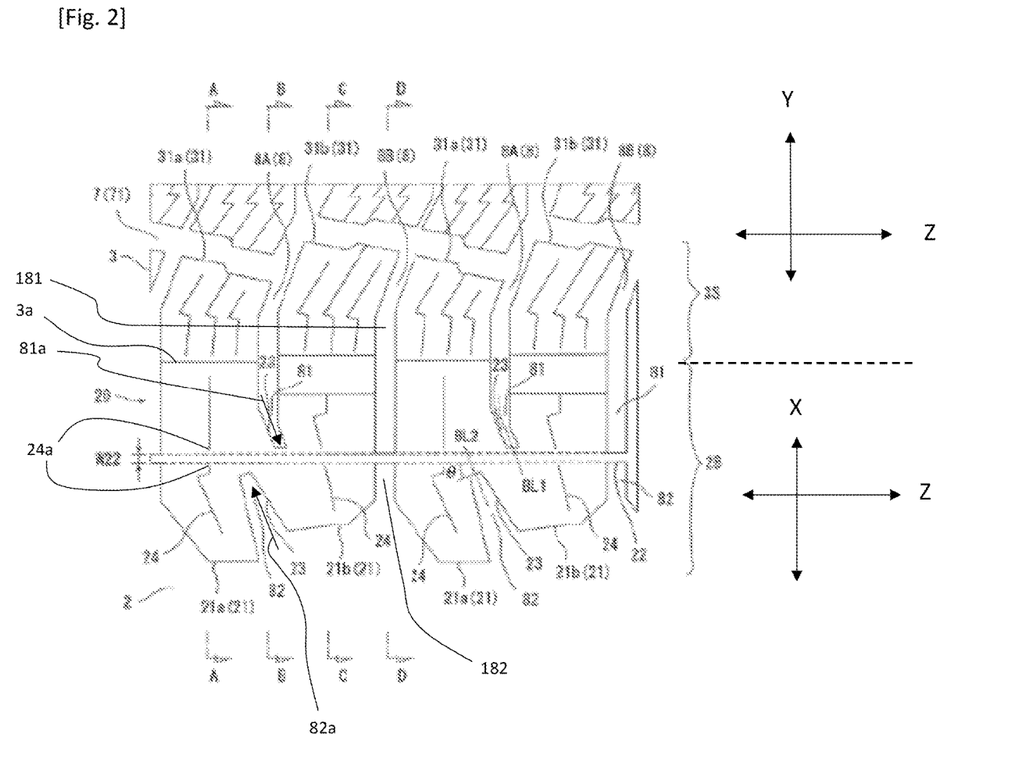
FIG. 2 is a developed view showing a shoulder area and a buttress area of the pneumatic tire in FIG. 1.

Embodiments of the present invention will be described below with reference to the drawings. FIG. 1 is a half sectional view along a tire meridian and schematically showing an example of a pneumatic tire according to the invention. FIG. 1 corresponds to a section along line A-A in FIG. 2. FIG. 2 is a developed view schematically showing a shoulder area and a buttress area of the pneumatic tire. In FIG. 2, a left-right direction corresponds to a tire circumferential direction, a downward direction corresponds to an outward direction in a tire width direction, and an upward direction corresponds to an inward direction in the tire width direction. FIGS. 3A to 3D are schematic views of sections along lines A-A, B-B, C-C, and D-D in FIG. 2, respectively.

The pneumatic tire T is an off-road pneumatic radial tire intended for traveling on a punishing road such as a muddy ground and a rocky stretch. As shown in FIG. 1, the pneumatic tire T includes a pair of bead portions 1, a pair of sidewall portions 2 extending outward in a tire diametrical direction X from each of the pair of bead portions 1, and a tread portion 3 connected to an outer end of each of the pair of sidewall portions 2 in the tire diametrical direction. Each of the bead portions 1 is provided with an annular bead core 1a formed by covering a bundle of steel wires or the like with rubber and a bead filler 1b disposed on an outer side of the bead core 1a in the tire diametrical direction.

The pneumatic tire T further includes a carcass 4 provided between the pair of bead portions 1, a belt 5 provided on an outer peripheral side of the carcass 4 in the tread portion 3, and an inner liner 6 provided on an inner peripheral side of the carcass 4 in order to maintain air pressure. The carcass 4 is in a toroidal shape as a whole and has end portions each of which is rolled up to wrap the bead core 1a and the bead filler 1b. The belt 5 includes two belt plies layered on inner and outer sides. A tread rubber 30 is provided on an outer peripheral side of the belt 5. The inner liner 6 faces an inner space of the tire T that is filled with air. In the sidewall portion 2, the inner liner 6 is directly attached to an inner peripheral side of the carcass 4 and no other member is provided between the inner liner 6 and the carcass 4. As shown in FIG. 1, the tread portion 3 is provided with an edge 3a at an outer end of the tire width direction Y of the tread portion 3.

As shown in FIGS. 1 and 2, a plurality of main grooves 7 extending along the tire circumferential direction Z and a plurality of lug grooves 8 extending in directions intersecting the tire circumferential direction are formed in a surface of the tread rubber 30. The plurality of lug grooves 8 is arranged at intervals in the tire circumferential direction. The pneumatic tire T has the plurality of lug grooves 8 extending outward in the tire width direction Y from the shoulder area 3S of the tread portion 3 to reach the buttress area 2B of the sidewall portion 2 and blocks defined by the plurality of lug grooves 8. The blocks defined by the lug grooves 8 include shoulder blocks 31 provided in the shoulder area 3S and buttress blocks 21 provided in the buttress area 2B. The plurality of shoulder blocks 31 and the plurality of buttress blocks are respectively arranged at intervals in the tire circumferential direction.

The shoulder area 3S is an area on outer sides of the shoulder main grooves 71 in the tire width direction in the tread portion 3. The shoulder main groove 71 is positioned on the outermost side in the tire width direction among the plurality of main grooves 7. The shoulder blocks 31 are provided on the outer sides in the tire width direction of the shoulder main groove 71. In the present embodiment, what is called staggered shoulder is employed. In the staggered shoulder, the shoulder blocks 31a having edges on relatively outer sides in the tire width direction and the shoulder blocks 31b having edges on relatively inner sides in the tire width direction are arranged alternately in the tire circumferential direction. With this structure, traction is generated by shearing resistance of the shoulder blocks 31a having the edges protruding farther outward than the shoulder blocks 31b, which improves punishing road run-through performance.

The buttress area 2B is an outer area of the sidewall portion 2 in the tire diametrical direction. More specifically, the buttress area 2B is an area on the outer side in the tire diametrical direction of tire largest width position 10 and is a portion that does not come in contact with a ground during normal traveling on a flat paved road. On a soft road such as the muddy ground and sandy soil, each of the tires sinks under a weight of a vehicle and the buttress area 2B comes in virtual contact with the ground. The tire largest width position 10 is a position where profile line of the tire T is farthest from a tire equator TE in the tire width direction. The profile line of the tire T is an outline of an outer surface of the sidewall portion 2 excluding protrusions such as a rim protector 11 and normally has a sectional shape along the meridian defined by smoothly connecting a plurality of arcs.

As shown in FIGS. 2 and 3A to 3D, the buttress blocks 21 are arranged on the outer side in the tire width direction of the shoulder blocks 31 and extend along the tire diametrical direction. A lower end (an inner end in the tire diametrical direction) of the buttress block 21 is arranged closer to an outer side in the tire diametrical direction than the tire maximum width position 10 is. The buttress blocks 21 are upraised from the outer surface 2a of the sidewall portion 2 along the profile line of the tire T.

In the present embodiment, buttress blocks 21a disposed on the outer side of the shoulder blocks 31a in the tire width direction and the buttress blocks 21b disposed on the outer side of the shoulder blocks 31b in the tire width direction are arranged alternately in the tire circumferential direction. A lower end of the buttress block 21a is positioned closer to an inner side in the tire diametrical direction than a lower end of the buttress block 21b is. In a portion not shown in the figures, the two kinds of buttress blocks 21a and 21b are arranged in the tire circumferential direction and the block arrangements form annular block row 20. However, not two but three or more kinds of buttress blocks may form the annular block row 20.

Since the tire T in the present embodiment is provided with the plurality of buttress blocks 21, the traction effect is exerted by the shearing resistance of the buttress blocks 21 in traveling on the punishing road such as the muddy ground and the rocky stretch, which enhances the punishing road run-through performance. Moreover, because the buttress blocks 21 are provided, it is possible to exert protection effect which is keeping an external injury factor such as angular portions of rock surfaces away from the outer surfaces 2a of the sidewall portions 2 to thereby improve external injury resistance. Further, the decoration effect can be achieved by the concavo-convex shape of the buttress block 21, and it is possible to improve the design property of the tire side surface.

In the tire T, a buttress area 2B is provided with an annular rib 22 which extends annularly along a tire circumferential direction while cutting across the buttress block 21. In the buttress area 2B, a plurality of lug grooves 8 are comparted into an outside lug groove 81 which is positioned in an outer side of the annular rib 22 in the tire diametrical direction and which extends in the extension direction 81a, and an inside lug groove 82 which is positioned in an inner side of the annular rib 22 in the tire diametrical direction and which extends in the extension direction 82a. The annular rib 22 is upraised from the outer surface 2a of the sidewall portion 2 in the same manner as the buttress block 21. In the present embodiment, an upraised height of the annular rib 22 on the basis of the outer surface 2a is greater than an upraised height of the buttress block 21, and a step is formed thereby. In the light of making the annular rib 22 hard to be conspicuous, the annular rib 22 may be formed flush. The buttress block 21 may include a position which is upraised more greatly than the annular rib 22.

The annular rib 22 is provided with a top surface having a predetermined width W22. The annular rib 22 has a sectional shape that is a shape of a mountain with a flat top face. To put it more concretely, the sectional shape is a shape of a stratovolcano with a slope gently curved and constricted. However, the sectional shape is not limited to this shape and may be other shapes such as a rectangular or trapezoidal shape with a flat top face and a triangular shape with a tapered top face. An upraised height of the annular rib 22 from the outer surface 2a is 5 mm or larger, for example, and is preferably 8 mm or larger. In the meanwhile, the upraised height of the buttress block 21 on the basis of the outer surface 2a is preferably 5 mm or larger, and more preferably 8 mm or larger, in the light of securing the traction effect and the protection effect. In the case where the upraised heights vary along the tire diametrical direction, the maximum values thereof are preferably in the range mentioned above.

The annular rib 22 is provided at such a position that a distance Da shown in FIG. 1 is in a range of 20 mm to 40 mm, for example. The distance Da is obtained as a tire diametrical distance from an outermost diametrical position 35 of the tire T to an outer edge in the tire diametrical direction of the top face of the annular rib 22. The annular rib 22 is provided at such a position that the distance db in FIG. 1 equals to 75% or more of a half width HW of the tire section, for example. The distance db is obtained as a distance in the tire width direction from the tire equator TE to the outer edge in the tire diametrical direction of the top face of the annular rib 22. The half width HW of the tire section is obtained as the distance in tire width direction from the tire equator TE to the tire maximum width position 10.

Figure 3A:
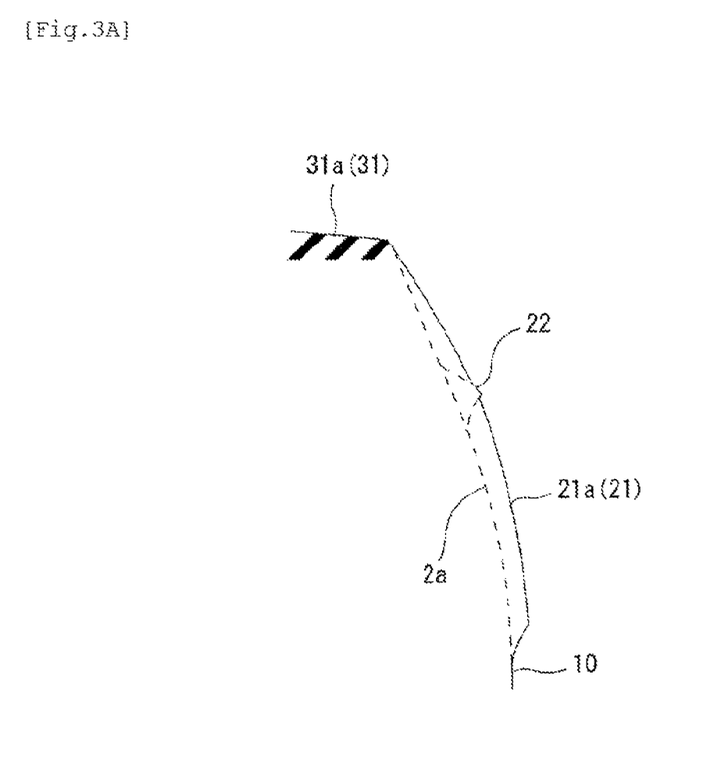
FIG. 3A is a schematic view of a section along line A-A in FIG. 2.
Figure 3B:
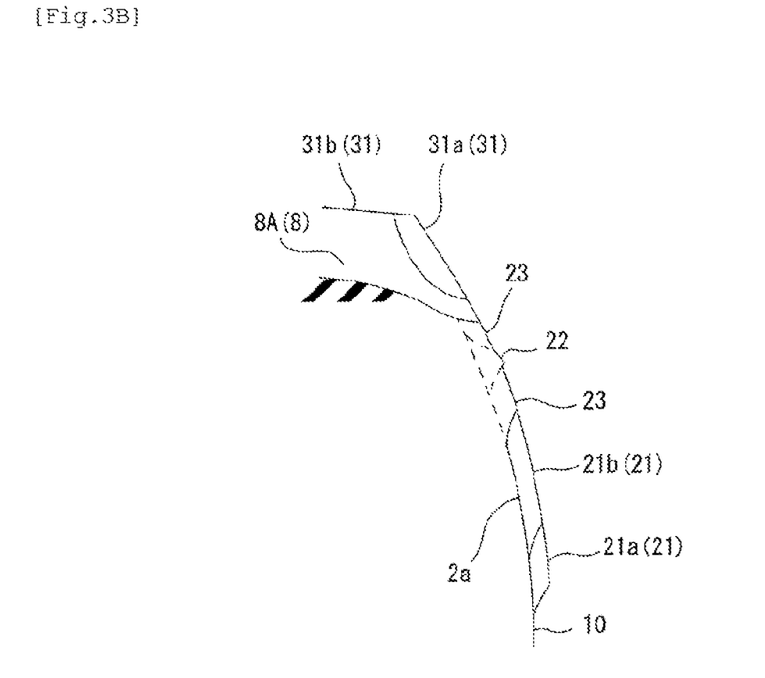
FIG. 3B is a schematic view of a section along line B-B in FIG. 2.
Figure 3C:
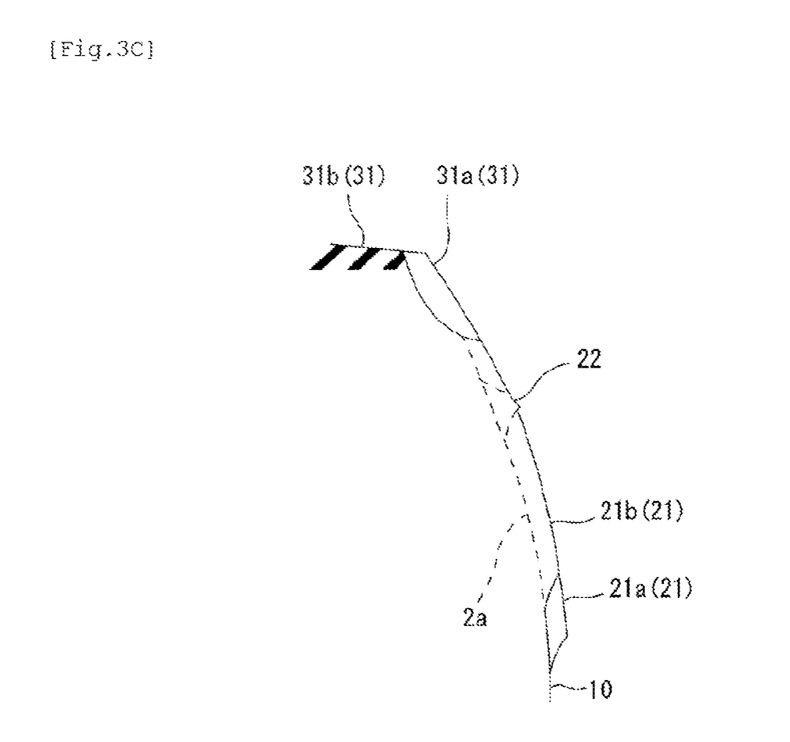
FIG. 3C is a schematic view of a section along line C-C in FIG. 2.
Figure 3D:
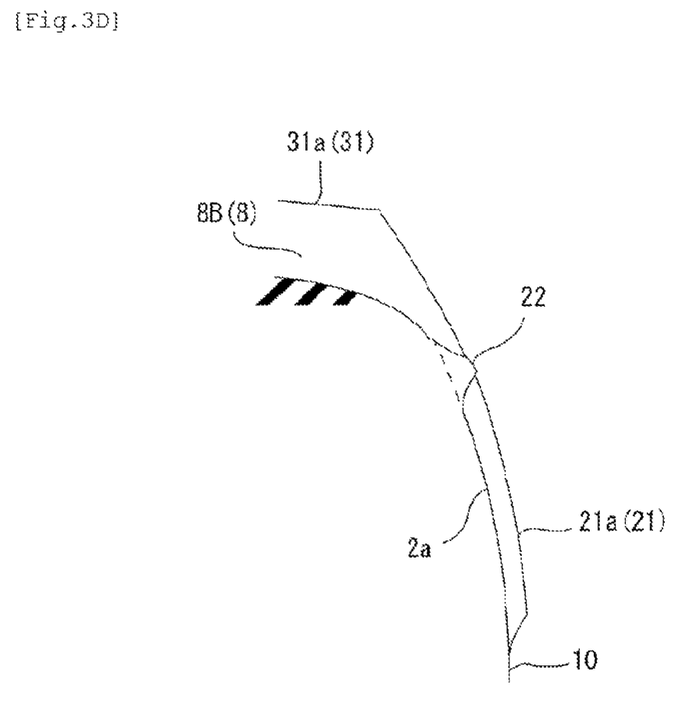
FIG. 3D is a schematic view of a section along line D-D in FIG. 2.

A widened portion 23 is provided in at least partial lug grooves 8A in a plurality of lug grooves 8 so as to enlarge a width of the annular rib 22. As shown in FIG. 2, the widened portion 23 extends in the tire circumferential direction so as to join a pair of buttress blocks 21 and 21 (that is, a buttress block 21a and a buttress block 21b) which are defined by the lug groove 8A. Further, as shown in FIG. 3B, the widened portion 23 is upraised from the outer surface 2a of the sidewall portion 2, and extends from the annular rib 22 in the tire diametrical direction. According to the structure mentioned above, the rigidity of the annular rib 22 is enhanced in the lug groove 8A in which the widened portion 23 is provided, and the protection effect of the buttress area 2B is improved. Further, on the basis of the provision of the widened portion 23 as mentioned above, the annular rib 22 is hard to be conspicuous as the boundary segmentalizing the buttress block 21, and the decoration effect of the buttress area 2B is improved.

Figure 4:
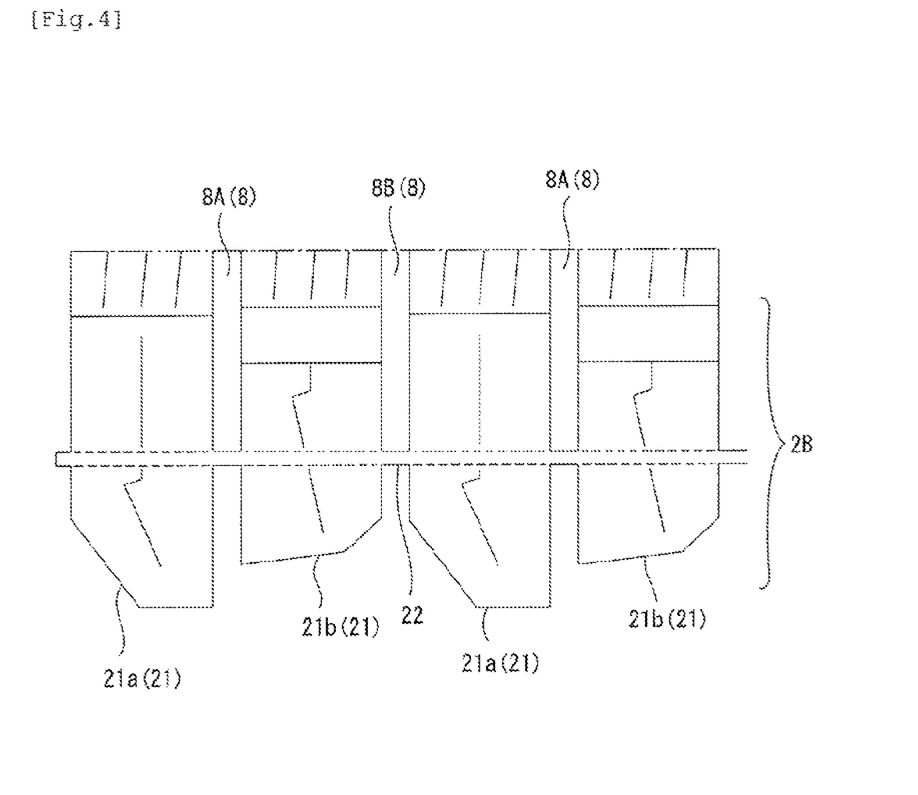
FIG. 4 is a developed view showing a buttress area according to a comparative example in which a widened portion is not provided.

FIG. 4 shows a comparative example for comparing with the present embodiment, and the same reference numerals are attached to the same portions as the portions described in the present embodiment. The buttress area 2B in FIG. 4 is the same as the buttress area 2B in FIG. 2 except that the widened portion is not provided in the lug groove 8A. In this comparative example, since the widened portion 23 in FIG. 2 is not provided, the annular rib 22 is visually conspicuous as the boundary segmentalizing the buttress block 21 in comparison with the case in FIG. 2. As a result, the design of the buttress block 21 is seen to be segmentalized into upper and lower sections by the annular rib 22, and there is the possibility that the buttress block applies a different impression from an intended one to a viewer. On the basis of the view point mentioned above, it can be said that there is room for improvement in relation to the decoration effect of the buttress area 2B, in the configuration shown in FIG. 4.

As shown in FIG. 2, among a plurality of lug grooves 8, the widened portion 23 is not provided in the other lug groove 8B, 181, 182 than the lug groove 8A in which the widened portion 23 is provided. In the present embodiment, one lug groove 8A in which the widened portion 23 is provided, and one lug groove 8B in which the widened portion 23 is not provided, are alternately arranged in the tire circumferential direction. As a result, the lug groove 8A and the lug groove 8B are appropriately mixed, the annular rib 22 serving as the boundary segmentalizing the buttress block 21 is hard to be conspicuous, and the decoration effect is well improved. In order to obtain the effect of improvement mentioned above, it is preferable to arrange alternately in the tire circumferential direction one lug groove 8A or two lug grooves 8A in which the widened portion 23 is provided, and one lug groove 8B or two lug grooves 8B in which the widened portion 23 is not provided.

In the present embodiment, the widened portion 23 is provided in both of the outer side and the inner side of the annular rib 22 in the tire diametrical direction. The lug groove 8A is provided with the widened portion 23 which extends outward in the tire diametrical direction from the annular rib 22, and the widened portion 23 which extends inward in the tire diametrical direction from the annular rib 22. As a result, it is possible to well enhance the protection effect of the buttress area 2B. Further, since the design sense of unity can be easily applied to the outer side of the annular rib 22 in the tire diametrical direction and the inner side of the annular rib 22 in the tire diametrical direction by the widened portion 23, the decoration effect of the buttress area 2B is improved.

In the present embodiment, in the lug groove 8A in which the widened portion 23 is provided, an extending direction of the outside lug groove 81 to the inner side in the tire diametrical direction and an extending direction of the inside lug groove 82 to the outer side in the tire diametrical direction are out of alignment each other. According to the structure mentioned above, in the lug groove 8A, it is possible to make the annular rib 22 appear as though the annular rib 22 does not extend in the tire circumferential direction, by reducing the design continuity between the outside lug groove 81 and the inside lug groove 82. As a result, the annular rib 22 serving as the boundary segmentalizing the buttress block 21 is hard to be conspicuous, and the decoration effect is well improved. Here, the extending direction of the outside lug groove 81 corresponds to an extending direction of a center line which passes through the center of a groove width of the outside lug groove 81, and the extending direction of the inside lug groove 82 is also based thereon (refer to chain lines BL1 and BL2 in FIG. 2).

In the lug groove 8A in which the widened portion 23 is provided, at least one of the extending direction of the outside lug groove 81 to the inner side in the tire diametrical direction, and the extending direction of the inside lug groove 82 to the outer side in the tire diametrical direction is preferably inclined to the tire circumferential direction. In the present embodiment, both the extending directions are inclined to the tire circumferential direction. More specifically, the extending direction of the outside lug groove 81 to the inner side in the tire diametrical direction is inclined to one side (a right side in FIG. 2) in the tire circumferential direction toward the inner side in the tire diametrical direction, and the extending direction of the inside lug groove 82 to the outer side in the tire diametrical direction is inclined to the other side (a left side in FIG. 2) in the tire circumferential direction toward the outer side in the tire diametrical direction. Therefore, these extending directions have a positional relationship that the extending directions do not intersect each other. As a result, the annular rib 22 serving as the boundary segmentalizing the buttress block 21 is hard to be more conspicuous, and the decoration effect is well improved.

In the lug groove 8A in which the widened portion 23 is provided, a termination of at least one of the outside lug groove 81 and the inside lug groove 82 is preferably inclined to the tire circumferential direction. As a result, in the lug groove 8A, it is possible to make the annular rib 22 appear as though the annular rib 22 does not extend in the tire circumferential direction, the annular rib 22 serving as the boundary segmentalizing the buttress block 21 is hard to be conspicuous, and the decoration effect is well improved. In the present embodiment, there is shown an example in which the termination of the inside lug groove 82 (the outer end in the tire diametrical direction) is inclined to the tire circumferential direction. In place of this, or in addition to this, the termination of the outside lug groove 81 (the inner end in the tire diametrical direction) may be inclined to the tire circumferential direction. In FIG. 2, there is shown an angle of gradient θ of the termination of the inside lug groove 82 in relation to the tire circumferential direction.

In the present embodiment, a sipe 24 is formed on a surface of a buttress block 21 which is defined by a lug groove 8A where a widened portion 23 is provided, as shown in FIG. 2. The sipe 24 is formed into an incision shape, and a groove width of the sipe 24 is smaller than a groove width of a lug groove 8. An edge component of the buttress block 21 is somewhat reduced by the provision of the widened portion 23, however, the edge component can be increased by forming the sipe 24 mentioned above in the buttress block 21. As a result, the sipe is of help to maintain and improve the traction effect. The sipe 24 extends along a tire diametrical direction, and is arranged in both of an outer side and an inner side of the annular rib 22 in the tire diametrical direction.

In the light of increase of the edge component by the sipe 24, a front end of the sipe 24 (or tip 24a) is preferably closer to the annular rib 22 than the outside lug groove 81 and the inside lug groove 82. In the present embodiment, the front end of the sipe 24 formed in the outer side of the annular rib 22 in the tire diametrical direction comes closer to the annular rib 22 than the outside lug groove 81, and the front end of the sipe 24 formed in the inner side of the annular rib 22 in the tire diametrical direction comes closer to the annular rib 22 than the inside lug groove 82. On the surface of the buttress area 2B, a distance from the front end of the sipe 24 in the outer side of the annular rib 22 in the tire diametrical direction to the annular rib 22 is smaller than a distance (corresponding to a distance D1 in FIG. 5) from the termination of the outside lug groove 81 to the annular rib 22. In the same manner, a distance from the front end of the sipe 24 in the inner side of the annular rib 22 in the tire diametrical direction to the annular rib 22 is smaller than a distance (corresponding to a distance D2 in FIG. 5) from the inside lug groove 82 to the annular rib 22.

The above-described respective dimensions are measured in a normal condition in which the tire is mounted to a normal rim and filled with air to normal internal pressure under no load. The "normal rim" refers to a rim specified for each tire by standards in a standard system including the standards according to which tires are provided, and is "Standard Rim" in JATMA, "Design Rim" in TRA, or "Measuring Rim" in ETRTO, for example. Moreover, the "normal internal pressure" refers to an air pressure specified for each tire by the standards in the standard system including the standards according to which tires are provided, and is "Maximum Air Pressure" in JATMA, a maximum value shown in Table, "TIRE LOAD LIMITS AT VARIOUS COLD INFLATION PRESSURES" in TRA, or "INFLATION PRESSURE" in ETRTO.

It is essential only that the annular block row 20 be formed on at least one of the sidewall portions 2. However, from a viewpoint of further satisfactory improvement of the protection effect and decoration effect of the buttress areas, it is preferable to form the annular block rows 20 on the sidewall portions 2 on both sides.

Figure 5:
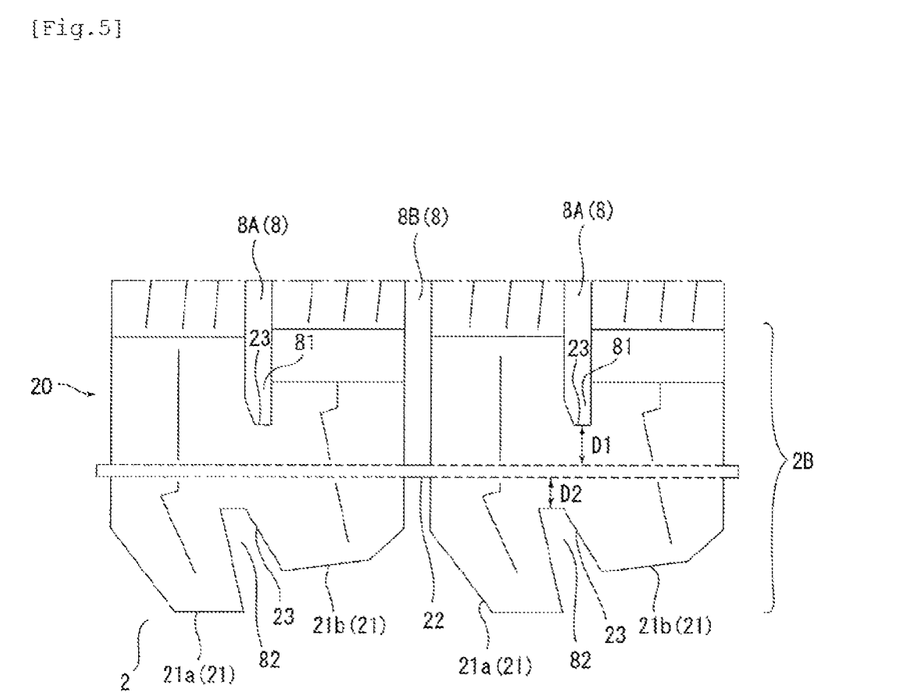
FIG. 5 is a developed view of a buttress area according to another embodiment of the invention.

In a modified example in FIG. 5, the distance D1 in the tire diametrical direction from the termination of the outside lug groove 81 to the annular rib 22, and the distance D2 in the tire diametrical direction from the termination of the inside lug groove 82 to the annular rib 22 are made larger than the embodiment in FIG. 2. In this embodiment, since the length of the widened portion 23 in the tire diametrical direction is great, it is possible to comparatively greatly improve the protection effect by the widened portion 23. In the light of well enhancing the protection effect by the widened portion 23 as mentioned above, each of the distances D1 and D2 is preferably 1 mm or larger, more preferably 3 mm or larger, and further preferably 5 mm or larger. Further, the distances D1 and D2 are, for example, equal to or less than 10 mm.

Figure 6:
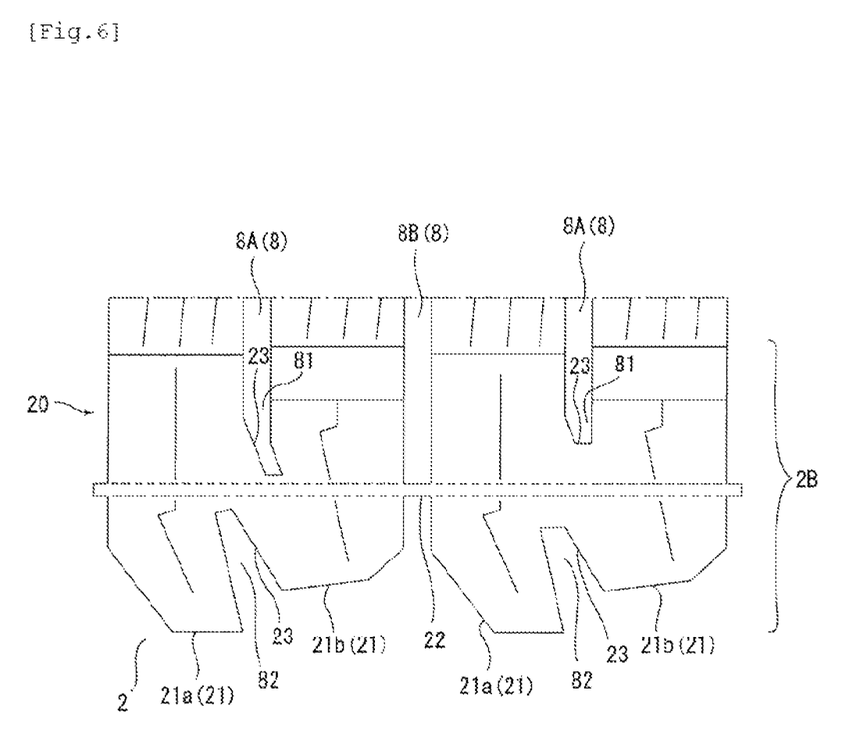
FIG. 6 is a developed view of a buttress area according to another embodiment of the invention.

In a modified example in FIG. 6, the lug groove 8A shown in FIG. 2 (the left lug groove 8A) and the lug groove 8A shown in FIG. 5 (the right lug groove 8A) are mixed as the lug groove 8A in which the widened portion 23 is provided. In the left lug groove 8A, a greater amount of edge components are provided in the buttress block 21 in comparison with the right lug groove 8A, and an excellent traction effect can be therefore obtained. Further, in the right lug groove 8A, a more excellent protection effect can be obtained as mentioned above than that in the left lug groove 8A. As a result, the left lug groove 8A and the right lug groove 8A are alternately arranged in the tire circumferential direction, for example, while holding the lug groove 8B therebetween with the left lug groove 8A and the right lug groove 8A mixed, and it is possible to improve the traction effect and the protection effect in a balanced manner.

The pneumatic tire according to the invention can be formed in the same way as that of a normal pneumatic tire except that the buttress area of the sidewall portion is formed in the above-described manners. Therefore, any of conventionally known materials, shapes, configurations, and manufacturing methods can be employed in the invention.

The present invention is not limited to the embodiment mentioned above, but can be improved and modified variously within the scope of the present invention.

What is claimed is:

1. A pneumatic tire having a tire circumferential direction, a tire width direction perpendicular to the tire circumferential direction, and a tire diametrical direction radially extending, comprising:
    a tread portion comprising:
        an edge extending along an outer end of the tire width direction of the tread portion; and
        a shoulder area in a vicinity of the edge;
        a shoulder block provided in the shoulder area; and
        a shoulder lug groove;
    a sidewall portion extending from the edge toward a radially inside of the tire diametrical direction, the sidewall portion comprising:
        a buttress area in a vicinity of the edge;
        an annular rib annularly extending along the tire circumferential direction;
        a buttress block provided in the buttress area;
        a first outside lug groove positioned at a radially outer side of the annular rib, the first outside lug groove extending from the shoulder lug groove without reaching the annular rib; and
        a first inside lug groove positioned at a radially inner side of the annular rib, the first inside lug groove extending toward a radially outside of the tire diametrical direction without reaching the annular rib,
    wherein a first extending direction of the first outside lug groove extending from the edge toward the annular rib is not aligned with a second extending direction of the first inside lug groove extending radially outward toward the annular rib,
    wherein the buttress block is provided with a sipe on a surface thereof,
    wherein a tip of the sipe closer to the annular rib is closer to the annular rib than a tip of the first outside lug groove and a tip of the first inside lug groove.

2. The pneumatic tire according to claim 1,
    wherein at least one of the first extending direction of the first outside lug groove and the second extending direction of the first inside lug groove is inclined with respect to the tire diametrical direction,
    wherein the first extending direction extends from the shoulder lug groove toward the annular rib,
    wherein the second extending direction extends radially outward toward the annular rib.

3. The pneumatic tire according to claim 1,
    wherein the first outside lug groove and/or the first inside lug groove is bent with respect to the tire circumferential direction.

4. The pneumatic tire according to claim 1, wherein the first extending direction is inclined to one of directions along the tire circumferential direction,
    wherein the second extending direction is inclined to the other of the directions along the tire circumferential direction.

5. A pneumatic tire having a tire circumferential direction, a tire width direction perpendicular to the tire circumferential direction, and a tire diametrical direction radially extending, comprising:
    a tread portion comprising:
        an edge extending along an outer end of the tire width direction of the tread portion; and
        a shoulder area in a vicinity of the edge;
        a shoulder block provided in the shoulder area; and
        a shoulder lug groove;
    a sidewall portion extending from the edge toward a radially inside of the tire diametrical direction, the sidewall portion comprising:
        a buttress area in a vicinity of the edge;
        an annular rib annularly extending along the tire circumferential direction;
        a buttress block provided in the buttress area;
        a first outside lug groove positioned at a radially outer side of the annular rib, the first outside lug groove extending from the shoulder lug groove without reaching the annular rib; and
        a first inside lug groove positioned at a radially inner side of the annular rib, the first inside lug groove extending toward a radially outside of the tire diametrical direction without reaching the annular rib, wherein a first extending direction of the first outside lug groove extending from the edge toward the annular rib is not aligned with a second extending direction of the first inside lug groove extending radially outward toward the annular rib, wherein the buttress block is provided with a sipe on a surface thereof, wherein the sipe provided on the buttress block extends along the tire diametrical direction, and is arranged in both outer side and inner side of the annular rib.

6. The pneumatic tire according to claim 5, wherein at least one of the first extending direction of the first outside lug groove and the second extending direction of the first inside lug groove is inclined with respect to the tire diametrical direction, wherein the first extending direction extends from the shoulder lug groove toward the annular rib, wherein the second extending direction extends radially outward toward the annular rib.

7. The pneumatic tire according to claim 5, wherein the first outside lug groove and/or the first inside lug groove is bent with respect to the tire circumferential direction.

8. The pneumatic tire according to claim 5, wherein the first extending direction is inclined to one of directions along the tire circumferential direction, wherein the second extending direction is inclined to the other of the directions along the tire circumferential direction.

* * * * *